(12) United States Patent
Schindler

(10) Patent No.: US 8,621,249 B2
(45) Date of Patent: *Dec. 31, 2013

(54) FACILITATING COMMUNICATION AND POWER TRANSFER BETWEEN ELECTRICALLY-ISOLATED POWERED DEVICE SUBSYSTEMS

(75) Inventor: Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,008

(22) Filed: Feb. 6, 2012

(65) Prior Publication Data

US 2012/0137144 A1    May 31, 2012

Related U.S. Application Data

(63) Continuation of application No. 11/964,086, filed on Dec. 26, 2007, now Pat. No. 8,112,641.

(51) Int. Cl.
*G06F 1/26* (2006.01)

(52) U.S. Cl.
USPC ............................ 713/300; 713/310; 713/340

(58) Field of Classification Search
USPC .......................................... 713/300, 310, 340
See application file for complete search history.

(56) References Cited

U.S. PATENT DOCUMENTS

| | | | |
|---|---|---|---|
| 5,745,670 A | 4/1998 | Linde | |
| 5,752,046 A | 5/1998 | Oprescu et al. | |
| 7,053,501 B1 | 5/2006 | Barrass | |
| 7,240,224 B1 | 7/2007 | Biederman | |
| 8,112,641 B2 * | 2/2012 | Schindler | 713/300 |
| 2002/0126806 A1 | 9/2002 | Rahamim et al. | |
| 2003/0040344 A1 | 2/2003 | Shteyn et al. | |
| 2004/0057511 A1 | 3/2004 | Liu | |
| 2004/0268278 A1 * | 12/2004 | Hoberman et al. | 716/5 |

(Continued)

FOREIGN PATENT DOCUMENTS

| | | |
|---|---|---|
| CN | 1393752 | 6/2001 |
| CN | 1484162 | 9/2002 |

(Continued)

OTHER PUBLICATIONS

Communication pursuant to Article 94(3) from the European Patent Office regarding Application No. 08 869 225.6 (7 pages), Dec. 13, 2010.

(Continued)

*Primary Examiner* — Paul Yanchus, III
(74) *Attorney, Agent, or Firm* — Baker Botts L.L.P.

(57) ABSTRACT

A system employing power over Ethernet (PoE) technology may include at least one powered device and power sourcing equipment (PSE). The powered device may include a first powered device (PD) subsystem and a second powered device (PD) subsystem that is electrically isolated from the first PD subsystem. The powered device may also include an interface connecting the first PD subsystem and the second PD subsystem. The PSE may be operable to provide power to one or more of the PD subsystems through a link connecting the PSE to the powered device. Also, the first PD subsystem may be operable to receive a communication from and transfer power to the second PD subsystem through the interface while maintaining the electrical isolation.

19 Claims, 4 Drawing Sheets

(56) References Cited

U.S. PATENT DOCUMENTS

| | | |
|---|---|---|
| 2005/0085212 A1 | 4/2005 | Peker et al. |
| 2005/0122140 A1 | 6/2005 | Peker et al. |
| 2005/0197094 A1 | 9/2005 | Darshan et al. |
| 2005/0268120 A1 | 12/2005 | Schindler et al. |
| 2006/0082220 A1 | 4/2006 | Karam et al. |
| 2006/0112288 A1 | 5/2006 | Schindler |
| 2006/0190739 A1 | 8/2006 | Soffer |
| 2006/0210057 A1 | 9/2006 | Stanford |
| 2007/0284941 A1 | 12/2007 | Robbins |
| 2008/0016263 A1 | 1/2008 | Diab et al. |
| 2008/0294811 A1* | 11/2008 | Diab et al. .................. 710/52 |
| 2008/0294918 A1* | 11/2008 | Dhuyvetter et al. .......... 713/310 |

FOREIGN PATENT DOCUMENTS

| | | |
|---|---|---|
| CN | 1627590 | 12/2003 |
| CN | 200986703 | 12/2006 |
| WO | WO 2006/138713 | 12/2006 ............. H04L 12/10 |
| WO | WO 2007/140467 | 12/2007 ............. H04M 1/00 |

OTHER PUBLICATIONS

Notification of Transmittal of the International Search Report and the Wrtiten Opinion of the International Searching Authority, or the Declaration; EPO/ISA; for PCT/US2008/087302, 15 pages, Jun. 17, 2009.

*European Patent Office*; Communication Pursuant to Article 94(3) EPC, Application 08 869 225.6-2415, Ref. file No. P33384EP-PCT; 5 pgs, Sep. 19, 2012.

State Intellectual Property Office of the People's Republic of China Search Report, Application No. 200880122838; and The First Office Action dated Aug. 31, 2012, received Dec. 20, 2012, 26 pages.

State Intellectual Property Office of the People's Republic of China The Second Office Action, Application No. 200880122838.0; dated Apr. 12, 2013, received May 13, 2013, 22 pages.

\* cited by examiner

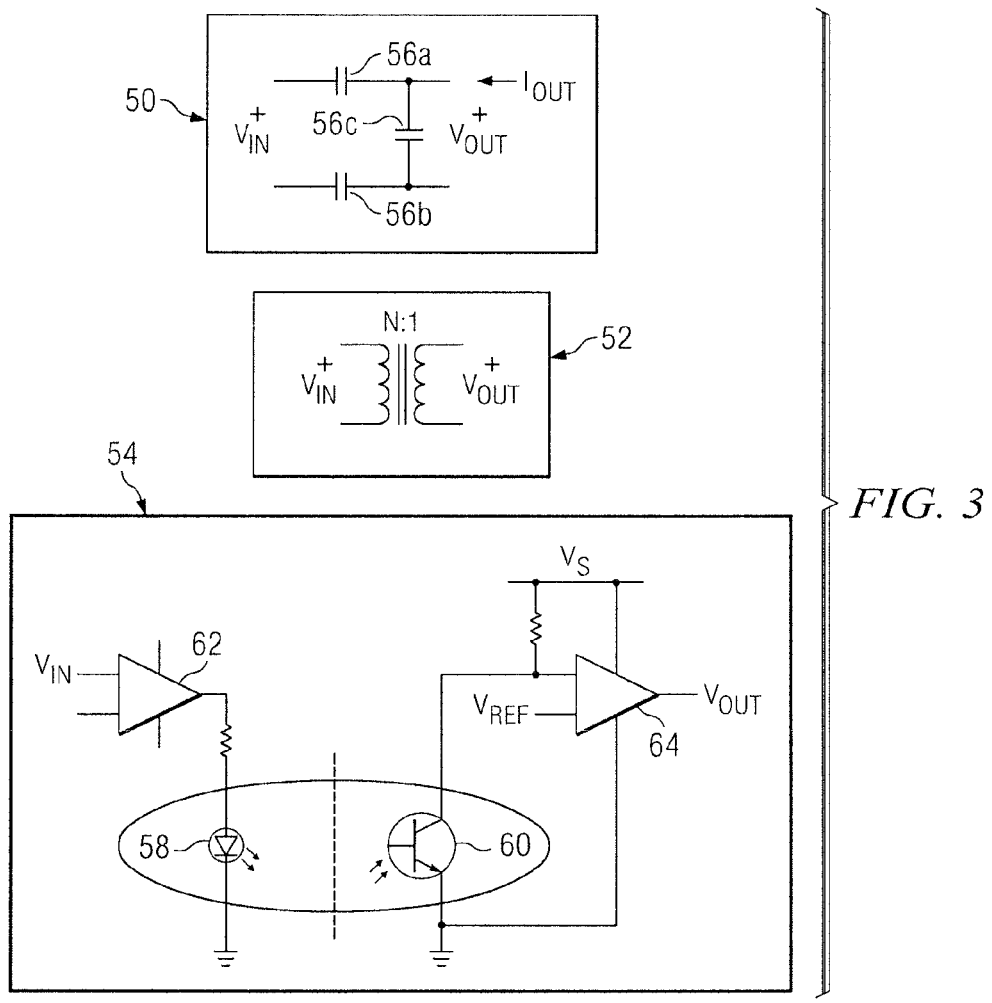
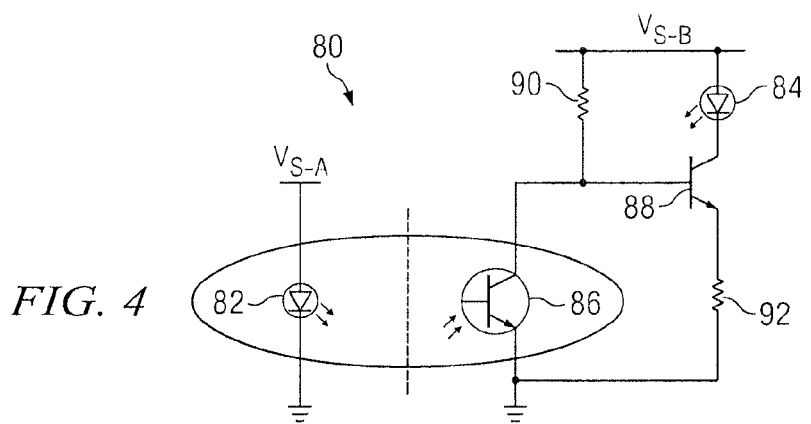

FACILITATING COMMUNICATION AND POWER TRANSFER BETWEEN ELECTRICALLY-ISOLATED POWERED DEVICE SUBSYSTEMS

CROSS REFERENCE TO RELATED APPLICATIONS

This application is a continuation of U.S. application Ser. No. 11/964,086, filed Dec. 26, 2007 by Frederick R. Schindler and entitled "Facilitating Communication and Power Transfer Between Electrically-Isolated Powered Device Subsystems".

TECHNICAL FIELD

The present disclosure relates generally to power over Ethernet (PoE) technology.

BACKGROUND

In power over Ethernet (PoE) technology, power sourcing equipment (PSE) may provide power over a standard twisted-pair Ethernet cable to one or more powered devices (PD) in an Ethernet network. This technology may be useful for powering network devices when it is undesirable to supply power through a separate connection. For example, an IP telephone may be connected to an Ethernet cable that transmits data and provides power without requiring a second wire to provide power via an electrical outlet, for example. The IEEE 802.3 standard specifies requirements for PoE devices. Over time, the complexity of PDs has increased. With this increase in complexity, the power required by these PDs has also increased.

BRIEF DESCRIPTION OF THE DRAWINGS

For a more complete understanding of the present invention and its advantages, reference is made to the following description taken in conjunction with the accompanying drawings in which:

FIG. 3 illustrates example interfaces that maintain electrical isolation while allowing communications to be sent through the interface;

FIG. 4 is an example circuit for reporting that a PD subsystem is underpowered;

DESCRIPTION OF EXAMPLE EMBODIMENTS

Overview

In particular embodiments, a system comprises a powered device and power sourcing equipment (PSE). The powered device comprises a first powered device (PD) subsystem, a second powered device (PD) subsystem electrically isolated from the first PD subsystem, and an interface connecting the first PD subsystem and the second PD subsystem. The power sourcing equipment (PSE) is connected to the powered device by a link and is operable to provide power to the first PD subsystem through the link. The first PD subsystem is operable to receive a communication from the second PD subsystem through the interface and to transfer power to the second PD subsystem through the interface.

In certain embodiments, a method comprises receiving a first amount of power at a first PD subsystem from a PSE and receiving an identification of a second amount of power from a second PD subsystem. The second amount of power represents a power deficit of the second PD subsystem, and the second PD subsystem is electrically isolated from the first PD subsystem. The method further comprises, based on the first amount of power and the second amount of power, determining whether to transfer power from the first PD subsystem to the second PD subsystem and maintaining electrical isolation between the first PD subsystem and the second PD subsystem when power is transferred from the first PD subsystem to the second PD subsystem.

DESCRIPTION

Figure 1:
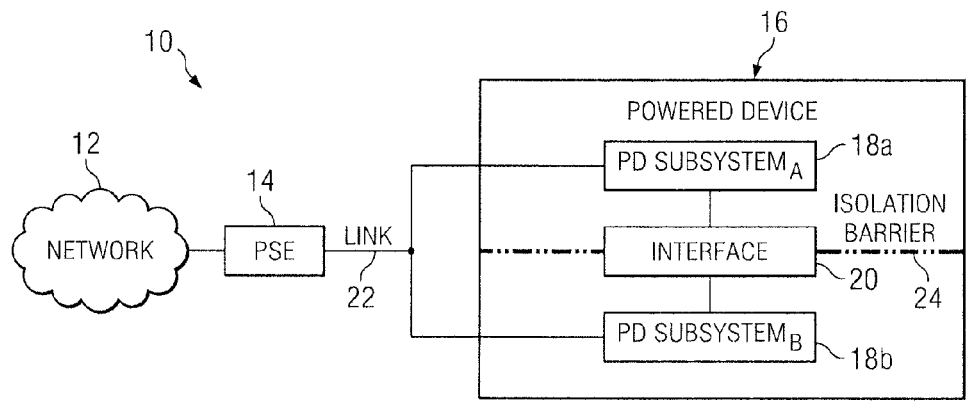
FIG. 1 illustrates a system for facilitating communication and power transfer between electrically-isolated powered device (PD) subsystems.

FIG. 1 illustrates a system, indicated generally at 10, for facilitating communication and power transfer between electrically-isolated powered device (PD) subsystems. As illustrated, system 10 includes a network 12, power sourcing equipment (PSE) 14, and a powered device 16, which includes two PD subsystems 18 and an interface 20. A link 22 connects power sourcing equipment 14 to powered device 16 and its PD subsystems 18.

Network 12 connects the elements in system 10 to other devices (not illustrated) and/or networks (not illustrated). In particular embodiments, network 12 is part of an Ethernet network. Network 12 may contain any suitable communication equipment, including hardware and any appropriate controlling logic. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network(s). Network 12 may include any combination of gateways, routers, hubs, switches, access points, base stations, and any other hardware or software implementing suitable protocols and communications.

Power sourcing equipment 14 provides power to powered device 16 and its PD subsystems 18. Power sourcing equipment may be abbreviated PSE. As illustrated, power sourcing equipment 14 provides power to powered device 16, PD subsystem 18a, and PD subsystem 18b; however, it is understood that any configuration of components may be employed. For example, multiple PSEs can be employed to provide power to powered device 16 and/or PD subsystems 18. Power sourcing equipment 14 may be an endpoint PSE or a midspan PSE. An endpoint PSE generates Ethernet data and includes circuitry to provide power to powered device 16. On the other hand, a midspan PSE stands between a regular Ethernet switch and one or more PD subsystems 18, injecting power without affecting the transmitted data.

In particular embodiments, power sourcing equipment 14 is responsible for determining the mode in which power will be delivered to powered device 16 and/or PD subsystems 18. For example, IEEE 802.3 describes two available modes (called mode A and mode B) for transmitting power from power sourcing equipment 14 to powered device 16. In mode A, pins 1 and 2 may form one side of the supply voltage while pins 3 and 6 provide the other side (for the return voltage). In mode B, pins 4 and 5 may form one side of the supply voltage while pins 7 and 8 provide the other side (for the return voltage). In other modes, different and/or additional pairs may be employed to provide a voltage source (through a supply voltage-return voltage combination). Moreover, in particular embodiments, different and/or additional pairs may be employed to provide more than one voltage source. Each voltage source may be used to power an electrically-isolated PD subsystem 18.

Link 22 connects power sourcing equipment 14 to powered device 16 and PD subsystems 18. In particular embodiments, link 22 is a standard twisted-pair Ethernet cable. Link 22 may include four pairs. In particular embodiments, link 22 is used to connect two pairs to PD subsystem 18a and two other pairs to PD subsystem 18b. In this manner, link 22 may allow each PD subsystem 18a, 18b to have a separate voltage source along an electrically isolated power path. In certain embodiments, link 22 includes two or more standard Ethernet cables. Link 22 may connect power sourcing equipment 14 and PD subsystems 18 in any suitable way so as to allow the transmission of data while providing power from power sourcing equipment 14 to powered device 16 and/or PD subsystems 18.

Powered device 16 may be any device configured to receive power and exchange data with elements in system 10. For example, powered device 16 may be an IP (internet protocol) phone, a web camera, a wireless access point, an Ethernet hub, or any other device configured to receive power through a standard twisted-pair Ethernet cable. In the illustrated embodiment, powered device 16 includes two PD subsystems 18 and interface 20. While system 10 is shown including a single powered device 16, it is to be understood that system 10 may include any suitable number of powered devices 16. For example, system 10 may include two powered devices 16, each including one of PD subsystems 18a, 18b.

PD subsystems 18 are subsystems or devices powered by power sourcing equipment 14. Generally, each PD subsystem 18 contains circuitry to extract power. Each PD subsystem 18 may also exchange data with devices in system 10. In particular embodiments, PD subsystem 18 and powered device 16 will be one and the same. In certain embodiments, as in the illustrated embodiment, powered device 16 will include multiple PD subsystems 18. One or more of PD subsystems 18 may provide functionality for detecting the presence and/or availability of power sourcing equipment 14. In particular embodiments, PD subsystem(s) 18 provides IEEE detection ability.

By including multiple PD subsystems 18, powered device 16 may electrically isolate components within different PD subsystems 18. Isolating components allows electrical noise to be isolated. For example, powered device 16 may be a web camera that includes a camera motor (which may be, for example, PD subsystem 18a) and a physical interface including camera control circuitry (which may be, for example, PD subsystem 18b). The camera motor circuits tend may be electrically noisy, while camera control circuitry tends to require a power supply that is electrically quiet. Because these circuits are in separate PD subsystems 18a, 18b that are electrically isolated, electrical noise in one PD subsystem 18 may not be transferred to the other PD subsystem 18. This may reduce the filtering that would be required if both PD subsystems 18a, 18b shared a common supply rail.

As another example, powered device 16 may be an IP phone that benefits from electrical isolation. The IP phone may include a physical interface including a central processing unit and digital signal processor (which may be, for example, PD subsystem 18a) and an audio circuit for driving a speaker (e.g., PD subsystem 18b). Audio circuits may be sensitive to electrical noise. By electrically isolating PD subsystems 18a, 18b, the amount of filtering required in the IP phone may be reduced.

Interface 20 allows communication and/or power transfer between PD subsystems 18 while maintaining electrical isolation between those PD subsystems 18. Interface 20 may have any of a variety of configurations. Example configurations of interface 20 that are designed to allow communication are provided with respect to FIGS. 3A, 3B, and 3C. Example configurations of interfaces that allow power transfer are provided with respect to FIG. 2 (e.g., switch 38) and FIGS. 5A and 5B.

Particular embodiments of a system for facilitating communication and power transfer between electrically-isolated PD subsystems 18 have been described and are not intended to be all inclusive. While system 10 is depicted as containing a certain configuration and arrangement of elements, it should be noted that this is a logical depiction, and the components and functionality of system 10 may be combined, separated and distributed as appropriate both logically and physically. For example, while powered device 16 is illustrated as including two PD subsystems 18a, 18b, it is to be understood that PD subsystems 18a, 18b may be components in any suitable device or devices. For example, system 10 may facilitate communication and power transfer between electrically isolated PD subsystems 18a, 18b that are each contained in a separate powered devices 16. Moreover, as illustrated, system 10 includes only one power sourcing equipment 14 connected to two PD subsystems 18; however, any suitable configuration and number of power sourcing equipment 14 and PD subsystems 18 may be employed in system 10. The functionality described with respect to system 10 may be provided by any suitable elements to facilitate communication and power transfer between electrically-isolated PD subsystems.

Figure 2:
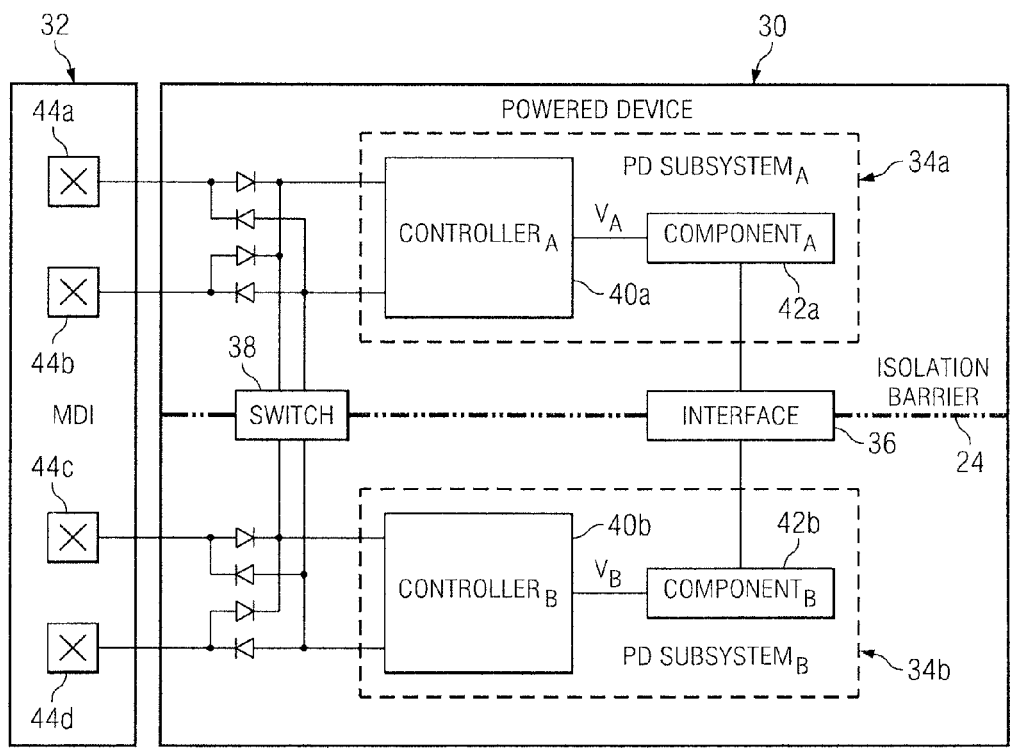
FIG. 2 illustrates a network device that facilitates communication between electrically-isolated PD subsystems.

FIG. 2 illustrates a powered device, indicated generally at 30, that facilitates communication between electrically-isolated powered device (PD) subsystems 34. In the illustrated embodiment, powered device 30 includes a media dependent interface (MDI) 32, two PD subsystems 34a, 34b, an interface 36, and a switch 38. In particular embodiments, powered device 30 is powered device 16 and PD subsystems 34a, 34b are PD subsystems 18a, 18b described above with respect to FIG. 1.

Powered device 30 receives power from power sourcing equipment (PSE) via MDI 32. As illustrated, MDI 32 is shown in the common mode view and contains four pairs 44a, 44b, 44c, 44d. Each pair 44 may be derived from the center-tap of a transformer used to isolate the PHY from the corresponding Ethernet MDI connections. In particular embodiments, pair 44a corresponds to pair (1,2) of a standard twisted-pair Ethernet cable; pair 44b corresponds to pair (3,6) of a standard twisted-pair Ethernet cable; pair 44c corresponds to pair (4,5) of a standard twisted-pair Ethernet cable; and pair 44d corresponds to pair (7,8) of a standard twisted-pair Ethernet cable. While MDI 32 is described and illustrated as including four pairs 44, it is to be understood that MDI 32 may include any suitable number of pairs 44 or functionally similar components.

In certain embodiments, two pairs 44a, 44b are employed to provide one power path to PD subsystem 34a, and two pairs 44a, 44b are employed to provide a second power path to PD subsystem 34a. By using different pairs to provide different power paths to each PD subsystem 34a, 34b, electrical isolation may be maintained. Moreover, by using two separate power paths (each using two pairs 44), powered device 30 may effectively double the available power received from power sourcing equipment 14.

As illustrated, powered device 30 includes two PD subsystems 34a, 34b. PD subsystem 34a may be electrically isolated from PD subsystem 34b, as is illustrated by isolation barrier 24. But, PD subsystem 34a may communicate and transfer power to PD subsystem 34b through interface 36. Likewise, in particular embodiments, PD subsystem 34b can communicate and transfer power to PD subsystem 34a through interface 36.

In the illustrated embodiment, each PD subsystem 34 includes a corresponding controller 40 and component 42. In particular embodiments, controller 40 may use the power received from power sourcing equipment 14 to generate a supply voltage. In the illustrated embodiment, the supply voltage generated by controller 40a in PD subsystem 34a is labeled $V_A$, and the supply voltage generated by controller 40b in PD subsystem 34b is labeled $V_B$. These supply voltages are used by the corresponding components 42a, 42b. Components 42 may be any device and/or circuitry in powered device 30. For example, when powered device 30 is a web camera, components 42a, 42b may be a camera motor and a physical interface including camera control circuitry. As another example, when powered device 30 is an IP phone, components 42a, 42b may be an audio circuit for driving a speaker and a physical interface including a central processing unit and digital signal processor.

Interface 36 allows communication and/or power transfer between PD subsystems 34 while maintaining electrical isolation between those PD subsystems 34. In particular embodiments, interface 36 is interface 20 described above with respect to FIG. 1. Interface 36 may have any of a variety of configurations, and example configurations of interface 36 are described with respect to FIGS. 3, 5A, and 5B.

Switch 38 may be included in powered device 30 in order to allow powered device 30 to transfer power between PD subsystems 34a, 34b. In particular embodiments, powered device 30 may include switch 38 in order to facilitate interoperability with legacy systems. Powered device 30 may close switch 38 to transfer power received on pairs 44a, 44b to pairs 44c, 44d or vice versa. Similarly, if both PD subsystems 34a, 34b obtain power from a PSE, then switch 38 may be opened. In particular embodiments, one of PD subsystems 34a, 34b opens switch 38 after receiving a communication from the other PD subsystem 34. This communication may indicate that the other PD subsystem 34 has begun receiving adequate power from the PSE. By closing switch 38, however, powered device may reduce or eliminate the electrical isolation previously maintained between PD subsystem 34a and PD subsystem 34b. Accordingly, in certain embodiments, switch 38 is included in powered device 30 and is employed only when powered device 30 requires that an unpowered one of PD subsystems 34a, 34b receive power. In certain embodiments, switch 38 is an electronic switch or a relay that is powered and controlled by the initially powered PD subsystem 34. Switch 38 may be employed to provide power to an indicator circuit that is operable to report an underpowered condition. In certain embodiments, when closed, switch 38 connects $V_A$ and $V_B$. This may allow a PSE to validly detect an underpowered PD subsystem 34 even though it is currently receiving power through switch 38. In particular embodiments, powered device 30 does not include switch 38.

In operation, powered device 30 is powered by a PSE. The PSE may be substantially similar to power sourcing equipment 14. Once it receives power, powered device 30 may determine whether the PSE is delivering a sufficient amount of power for the operation of powered device 30. In order to make this determination, PD subsystem 34a and PD subsystem 34b may communicate. For example, PD subsystem 34a may inform PD subsystem 34b of its power deficit. The power deficit may indicate the amount of power that PD subsystem 34a requires in addition to the power it is currently receiving from the PSE. Similarly, PD subsystem 34b may inform PD subsystem 34a of its power deficit. If the total amount of power received by PD subsystem 34a and PD subsystem 34b is greater than or equal to the total amount of power required by both PD subsystems 34a, 34b, then powered device 30 may determine that it is adequately powered.

Otherwise, powered device 30 may determine that an underpowered condition has occurred. In response, powered device 30 report the underpowered condition. In particular embodiments, powered device 30 may employ circuitry in the powered PD subsystem 34 to report the underpowered condition. For example, the powered one of PD subsystems 34 may include a physical interface and control circuitry, which may be used to transmit a message indicating the underpowered status to the PSE or a control device in system 10. In certain embodiments, powered device 30 may use an indicator circuit to report the underpowered condition. An example of such an indicator circuit is shown and described with respect to FIG. 4. While these two specific examples are described, it is understood that powered device 30 (or one or more of its components) may use any suitable methods to report an underpowered condition.

Also, when an underpowered condition occurs, powered device 30 may make the best use of the power provided by the PSE. In particular embodiments, powered device 30 transfers power from the powered PD subsystem 34 to the unpowered (or underpowered) PD subsystem 34. In certain embodiments, powered device 30 may determine that power should be transferred even though an underpowered condition did not occur. For example, one PD subsystem 34 may be underpowered while the other PD subsystem 34 has sufficient power. In these situations, powered device 30 may transfer power from the powered PD subsystem 34 to the underpowered PD subsystem 34. Example circuits allowing such a power transfer while maintaining electrical isolation are illustrated and described in FIGS. 5A and 5B.

In general, PD subsystems 34a, 34b may communicate to cooperatively aggregate their power needs, to request a sufficient total power from the PSE (while complying with standards limiting the power provided by each power path), to control circuit operation within another PD subsystem 34, and/or to accomplish other appropriate goals. Example circuits for allowing communications while maintaining electrical isolation are illustrated and described in FIG. 3. With both communication and the ability to transfer power between PD subsystems 34, two PD subsystems 34 may work together to negotiate the power provided by the PSE. The described decisions and determinations that are attributed to powered device 30 may be controlled by simple hardware circuitry or may be generated by a microprocessor implementing software.

Particular embodiments of a powered device 30 that facilitates communication between electrically-isolated powered devices have been described and are not intended to be all inclusive. While powered device 30 is depicted as containing a certain configuration and arrangement of elements, it should be noted that this is a logical depiction, and the components and functionality of powered device 30 may be combined, separated and distributed as appropriate both logically and physically. For example, while powered device 30 is depicted as including two PD subsystems 34, it is to be understood that powered device 30 may include any suitable number of PD subsystems 34. In certain embodiments, system 10 includes at least two powered devices 30 each having one PD subsystem 34, where the two PD subsystems 34 in the two powered devices 30 can communicate and transfer power through interface 36. As another example, MDI 32 may or may not be a component within powered device 30. And, as a final example, while MDI 32 is depicted as containing four pairs 44, it is to be understood that MDI 32 may contain any suitable components to provide any number of distinct power paths to powered device 30.

FIG. 3 illustrates three example interfaces that maintain electrical isolation while allowing communications to be sent through the interface. As illustrated, FIG. 3 shows a capacitively coupled interface 50, a transformer coupled interface 52, and an opto-coupler interface 54. In particular embodiments, interface 36 (described above with respect to FIG. 2) is capacitively coupled interface 50, transformer coupled interface 52, or an opto-coupler interface 54.

In particular embodiments, capacitively coupled interface 50 is used in order to allow communications while preserving electrical isolation. For example, capacitively coupled interface 50 may allow communications between electrically-isolated PD subsystems 18, 34. Capacitively coupled interface 50 may preserve electrical isolation by reducing or eliminating the amount of direct current (DC) that is able to flow between isolated sections. As illustrated, capacitively coupled interface 50 includes two capacitors 56a, 56b in series and one additional capacitor 56c connecting the two series capacitors across $V_{OUT}$. In operation, capacitively coupled interface 50 receives a signal encoded in a time varying current. This signal is received at $V_{IN}$. Because the signal has an alternating voltage, the signal may be minimally filtered as it passes through capacitors 56a, 56b, 56c. Accordingly, capacitively coupled interface 50 may send a signal from $V_{IN}$ to $V_{OUT}$ while preserving electrical isolation. Capacitively coupled interface 50 may relay signals transmitted in either direction.

In certain embodiments, transformer coupled interface 52 is used in order to allow communications while preserving electrical isolation. For example, transformer coupled interface 52 may allow communications between electrically-isolated PD subsystems 18, 34. Transformer coupled interface 52 may preserve electrical isolation by reducing or eliminating the amount of DC current that is able to flow between isolated sections. As illustrated, transformer coupled interface 52 includes an isolation transformer with an N:1 ratio. One side of the transformer connects to $V_{IN}$, while the other side connects to $V_{OUT}$. A transformer electrically isolates direct current (DC), but may relay a signal's time varying current components. Accordingly, transformer coupled interface 52 may permit communication while preserving electrical isolation. Transformer coupled interface 52 may relay signals transmitted in either direction.

In some embodiments, opto-coupler interface 54 is used in order to allow communications while preserving electrical isolation. For example, opto-coupler interface 54 may allow communications between electrically-isolated PD subsystems 18, 34. Opto-coupler interface 54 may preserve electrical isolation by reducing or eliminating the amount of direct current (DC) that is able to flow from $V_{IN}$ to $V_{OUT}$. Among other elements, the illustrated opto-coupler interface 54 includes a light emitting diode (LED) 58 and a light sensitive transistor 60. In the illustrated embodiment of opto-coupler interface 54, data is received by $V_{IN}$, causing the voltage on the output of amplifier 62 to be greater than the reference voltage. Current will flow through LED 58, causing LED 58 to generate light. This light is sensed by transistor 60, which draws current from high voltage ($V_S$). The presence or absence of this current flow directly affects the output of amplifier 64—namely, $V_{OUT}$. By this process, opto-coupler interface 54 may send the received signal to $V_{OUT}$ while preserving electrical isolation. In the illustrated embodiment, opto-coupler interface 54 is only able to relay signals transmitted in one direction (from $V_{IN}$ to $V_{OUT}$). However, it is to be understood that a similar circuitry may be incorporated to allow communication in the opposite direction. In particular embodiments, opto-coupler interface 54 may receive differential inputs so that LED 58 is driven when a positive input is detected and it is not driven when a negative input is detected, for example. While opto-coupler interface 54 is illustrated as including connections to reference or ground voltages, it is to be understood that any suitable voltages may be used in place of these connections.

Particular embodiments of a network device interface have been described and are not intended to be all inclusive. While capacitively coupled interface 50, transformer coupled interface 52, and opto-coupler interface 54 are each depicted as containing a certain configuration and arrangement of elements, it should be noted that these are simply examples. The elements within these interfaces 50, 52, 54 may be combined, separated and distributed as appropriate. A powered device and/or PD subsystem(s) may employ any suitable interface(s) that maintains electrical isolation while allowing communication through the interface.

FIG. 4 is an example circuit, indicated generally at 80, for reporting that a PD subsystem 34 is underpowered. As explained briefly above, powered device 30 can provide a notification that it is underpowered. The underpowered condition may occur when powered device 30 is connected to legacy power sourcing equipment. In the illustrated embodiment, circuit 80 is designed to report when PD subsystem 34a is underpowered. A similar circuit can also be included to report when PD subsystem 34b, powered device 30, or other powered devices or PD subsystems are underpowered.

Circuit 80 is connected to $V_{S-A}$, $V_{S-B}$, and ground. As illustrated, $V_{S-A}$ is the supply voltage for PD subsystem 34a and may be derived from $V_A$ (the voltage supplied to component 42a within PD subsystem 34a). As illustrated, $V_{S-B}$ is the supply voltage for PD subsystem 34b and may be derived from $V_B$ (the voltage supplied to component 42b within PD subsystem 34b). While circuit 80 is illustrated as having these example connections, it is to be understood that any suitable voltages may be connected to circuit 80. For example, portions of circuit 80 illustrated as connecting to a common ground may connect to any suitable reference voltage(s).

In the illustrated embodiment, circuit 80 includes two light emitting diodes (LEDs) 82, 84, a light sensitive transistor 86, a standard transistor 88, and two resistors 82, 84. When PD subsystem 34b is powered and PD subsystem 34a is not powered (or underpowered), $V_{S-A}$ will be approximately equal to 0 V and $V_{S-B}$ will have a voltage (in other words, will be sufficiently greater than 0 V). With $V_{S-A}$ not present, LED 82 will not be illuminated. This will cause transistor 86 to not be driven, resulting in a high voltage at the base of transistor 88. (Transistor 88 may be a bipolar transistor, a MOSFET transistor, or any other appropriate component.) This high base will drive transistor 88, causing current to flow through LED 84. Accordingly, LED 84 may be illuminated when PD subsystem 18a is underpowered.

Particular embodiments of a circuit for reporting that a component in the network device is underpowered have been described and are not intended to be all inclusive. While circuit 80 is depicted as containing a certain configuration and arrangement of elements, it should be noted that this is simply an example. The elements within this circuit may be combined, separated and distributed as appropriate. Different circuits containing some, all, or none of the elements described in circuit 80 may be used to report that a component in a powered device is underpowered.

Figure 5A:
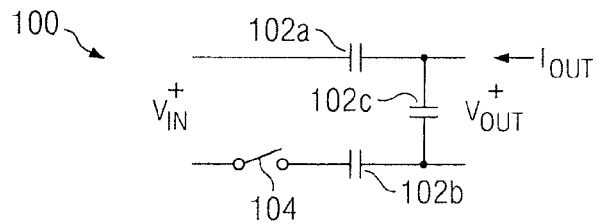
FIGS. 5A-5B illustrate example circuits for transferring power between electrically-isolated PD subsystems.
Figure 5B:
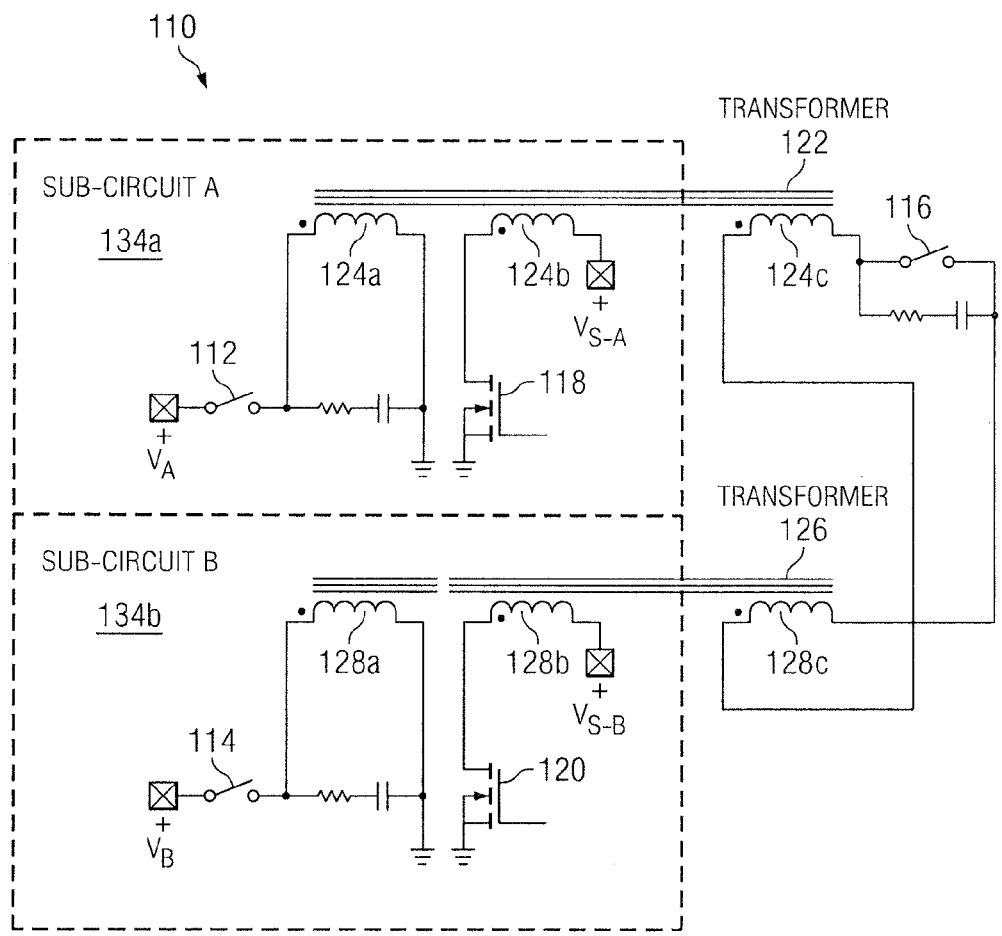

FIGS. 5A-5B illustrate example circuits for transferring power between electrically-isolated PD subsystems. FIG. 5A illustrates a circuit 100 for transferring power from a first PD subsystem 34a to a second PD subsystem 34b. Within the following explained example, assume that PD subsystem 34a is powered while PD subsystem 34b is not powered. $V_{IN}$ may be connected to the supply voltage of the powered PD subsystem 34a (in this example, $V_{S-A}$), and $V_{OUT}$ may be connected to the supply voltage of the unpowered PD subsystem 34b (in this example, $V_{S-B}$).

As illustrated, circuit 100 includes three capacitors 102a, 102b, 102c and a switch 104. In an example operation, switch 104 may be opened and closed at a particular frequency in order to transfer power from the powered PD subsystem 18 to the unpowered PD subsystem (in this example, from PD subsystem 34a to PD subsystem 34b). In an example operation, switch 104 may be opened and closed at a rate of "f" with a nominal 50% duty cycle. The values of the capacitors 102a, 102b, 102c and the duty cycle selected will alter the available output current ($I_{OUT}$) and average output voltage ($V_{OUT}$). In the illustrated embodiment, the relation between $I_{OUT}$, $V_{OUT}$, $V_{IN}$, f, and the values of the capacitors 102a, 102b, and 102c ($C_1$, $C_2$, and $C_3$, respectively) is given by the following equation:

$$I_{OUT} \le -C_3(V_{IN} - V_{OUT})f$$

$$V_{OUT} \le V_{IN}\left(\frac{C_1 C_2}{C_1 + C_2}\right) \bigg/ \left(\frac{C_1 C_2}{C_1 + C_2} + C_3\right)$$

In particular embodiments, circuit 100 further includes filter and/or voltage regulation circuits. In certain embodiments, a diode is used in place of or in addition to switch 104. This diode may be designed to conduct when $V_{IN}$ is present (e.g., greater than 0 V) and prevent conduction when $V_{IN}$ is absent (e.g., approximately equal to 0 V).

In certain embodiments, circuit 100 provides less power to PD subsystem 34b than PD subsystem 34b would be able to obtain directly when powered by power sourcing equipment 14. However, circuit 100 may enable minimal circuit function to be accomplished in PD subsystem 34b when it would otherwise remain unpowered. For example, powered device 30 may be an IP phone and PD subsystem 34b may be the IP phone's audio subsection, which drives a handset and a speaker phone. If PD subsystem 34b obtains power directly from power sourcing equipment 14, then PD subsystem 34b may have enough power to use the handset and/or the speaker phone. However, if circuit 100 transfers power from PD subsystem 34a to PD subsystem 34b, PD subsystem 34b may have only enough power to operate an IP phone's handset.

While circuit 100 has been described as transferring power from PD subsystem 34a to PD subsystem 34b, it is to be understood that these principles are equally applicable for a power transfer from PD subsystem 34b to PD subsystem 34a. In that situation, $V_{IN}$ may be connected to the supply voltage of PD subsystem 34b ($V_{S-B}$), and $V_{OUT}$ may be connected to the supply voltage of PD subsystem 34a ($V_{S-A}$).

FIG. 5B illustrates another example circuit 110 for transferring power between PD subsystems 34. As illustrated, circuit 110 connects to $V_A$, $V_{S-A}$, $V_B$, $V_{S-B}$, and ground. $V_A$ and $V_B$ may be voltages corresponding to the power received from power sourcing equipment 14, and $V_{S-A}$ and $V_{S-B}$ may be the supply voltages used by components 42a, 42b within PD subsystems 34a, 34b, respectively. In an example embodiment, circuit 110 is employed in powered device 16, where powered device 16 is a web camera that includes two PD subsystems 34a, 34b. PD subsystem 34a may include the central processing unit and signal processing circuitry, and PD subsystem 34b may include the tilt, pan, and zoom motors. For this embodiment, $V_{S-A}$ may be the supply voltage used to power the central processing unit and signal processing circuitry, while $V_{S-B}$ may be the supply voltage used to power the camera's motors. While circuit 110 is illustrated as having these example connections, it is to be understood that any suitable voltages may be connected to circuit 110. For example, portions of circuit 110 illustrated as connecting to a common ground may connect to different grounded voltages.

Circuit 110 includes a flyback DC-to-DC design. In the illustrated embodiment, circuit 110 includes switches 112, 114, 116, synchronous rectifiers 118, 120, transformer 122 including inductors 124a, 124b, 124c, and transformer 126 including inductors 128a, 128b, 128c. Switches 112, 114 may control the amount of power drawn from power made available by power sourcing equipment. Switch 116 may control the amount of power transferred between PD subsystems 34a, 34b. Synchronous rectifier 118 and transformer 122 (and its inductors 124a, 124b, 124c) may work with other circuit elements to transfer power from $V_A$ (or subcircuit 134b) to the supply voltage $V_{S-A}$. Likewise, synchronous rectifier 120 and transformer 126 (and its inductors 128a, 128b, 128c) may work with other circuit elements to transfer power from $V_B$ (or subcircuit 134a) to the supply voltage $V_{S-B}$.

In an example situation, both PD subsystems 34a, 34b are powered. In particular embodiments, no power is transferred between PD subsystems 34a, 34b when both PD subsystems are powered. In this case, switch 116 remains open and subcircuits 134a, 134b each operate independently. In subcircuit 134a, for example, switch 112 may be closed sequentially in order to build up energy in inductors 124a, 124b. This energy may be extracted from $V_A$. Synchronous rectifier 118 may then operate to transfer energy from inductor 124 to $V_{S-A}$. In particular embodiments, subcircuit 134a and its constituent elements are controlled by PD subsystem 34a. In a similar manner, subcircuit 134b may uses switch 114, inductors 128a, 128b, and synchronous rectifier 120 to transfer energy from $V_B$ to $V_{S-B}$. Subcircuit 134b and its constituent elements may be controlled by PD subsystem 34b.

In a second example situation, only one of PD subsystems 34a, 34b is powered. When only one of PD subsystems 34 is powered (and the other is not powered), switch 116 can be controlled to transfer energy from the powered PD subsystem 34 to the unpowered PD subsystem 34. For the purposes of this example, assume that PD subsystem 34a is powered while PD subsystem 34b is not powered. In this example, $V_A$ has a voltage (e.g., $V_A>0$ V), but $V_B$ does not have a voltage (e.g., $V_B\sim0$ V).

Switch 116 may control the amount of power transferred between PD subsystems 34 (in this case, from PD subsystem 34a to PD subsystem 34b). In particular embodiments, switch 116 is opened and closed at a rate of "f," with a nominal 50% duty cycle. The duty cycle selected may alter the amount of current and voltage that is transferred. The length of time that switch 116 is closed may determine the amount of power transferred from PD subsystem 34a to PD subsystem 34b. By opening and closing switch 116, energy is transferred from transformer 122 to transformer 126 by way of inductors 124c, 128c. Transformer 126 may then transfer energy to inductors 128a, 128b. As explained above, subcircuit 134b can be controlled so that energy can be transferred from transformer 126 (and its inductors 128a, 128b) to $V_{S-B}$.

In an example operation for transferring power in this second situation, switch 112 is closed first to transfer energy from $V_A$ to transformer 122. Then, switch 116 is closed to transfer energy from transformer 122 to transformer 126. After the energy has transferred, both switch 112 and switch 116 may be opened. At the same time, synchronous rectifiers 118, 120 may be turned on in order to transfer energy from transformers 122, 126 to $V_{S-A}$ and $V_{S-B}$, respectively. This example operation may then repeat to continue the flow of power.

In a third example situation, both PD subsystems 34a, 34b are powered, and circuit 110 is employed to transfer power between PD subsystems 34a, 34b. This third example operation may employ a similar operation as was described with respect to the second example operation. For example, switch 112 may be closed to transfer energy from $V_A$ to transformer 122, and switch 114 may be closed to transfer energy from $V_B$ to transformer 126. Then, switch 114 may be opened while switch 116 is closed to transfer energy from transformer 122 to transformer 126. After the energy has transferred, switches 112, 116 may be opened. At the same time, synchronous rectifiers 118, 120 may be turned on in order to transfer energy from transformers 122, 126 to $V_{S-A}$ and $V_{S-B}$, respectively. This example operation may then repeat to continue the flow of power.

Using circuit 110, power transfer may be accomplished while keeping the power supply voltages (e.g., $V_{S-A}$ and $V_{S-B}$) in each PD subsystem 34a, 34b electrically-isolated from each other. In certain embodiments, the powered PD subsystem 34 controls switch 116 from startup (e.g., when $V_{S-A} \approx V_{S-B} \approx 0$) until the supply voltage of the unpowered PD subsystem 34 (e.g., $V_{S-A}$ or $V_{S-B}$) reaches a predetermined level. Once the supply voltage of the unpowered PD subsystem 34 has reached a particular level, control of switch 116 may pass to the unpowered PD subsystem 34. In particular embodiments, switch 116 is only closed when both switch 112 and switch 114 are also closed. Moreover, in the illustrated embodiment, circuit 110 is simplified to highlight the inductive coupling mechanism. In other embodiments, circuit 110 may include any suitable additional and/or alternate components.

Particular embodiments of a circuit for transferring power between electrically-isolated powered devices have been described and are not intended to be all inclusive. While circuit 100 and circuit 110 are depicted as containing a certain configuration and arrangement of elements, it should be noted that this is simply an example. The elements within this circuit may be combined, separated and distributed as appropriate. For example, circuit 110 may or may not include inductors 124b, 128b. In particular embodiments, circuit 110 includes only one of inductors 124b, 128b so that all received power may be transferred to a common supply voltage ($V_{S-A}$ or $V_{S-B}$). As another example, circuit 110 may contain a single transformer 122, 126. In certain embodiments, circuit 110 combines transformers 122, 126, eliminates inductors 124c, 128c, and operates switches 112, 114 out of phase in order to transfer power to the respective supply voltages. As a third example, circuit 110 may combine the supply voltages ($V_{S-A}$ or $V_{S-B}$) in any suitable manner as is known to those of skill in the art.

Different circuits containing some, all, or none of the elements described in circuits 100, 110 may be used to transfer power between electrically-isolated PD subsystems. In particular embodiments, rather than employing circuit 100 or circuit 110, powered device 30 includes switch 38 in order to transfer power between different PD subsystems 34.

Figure 6:
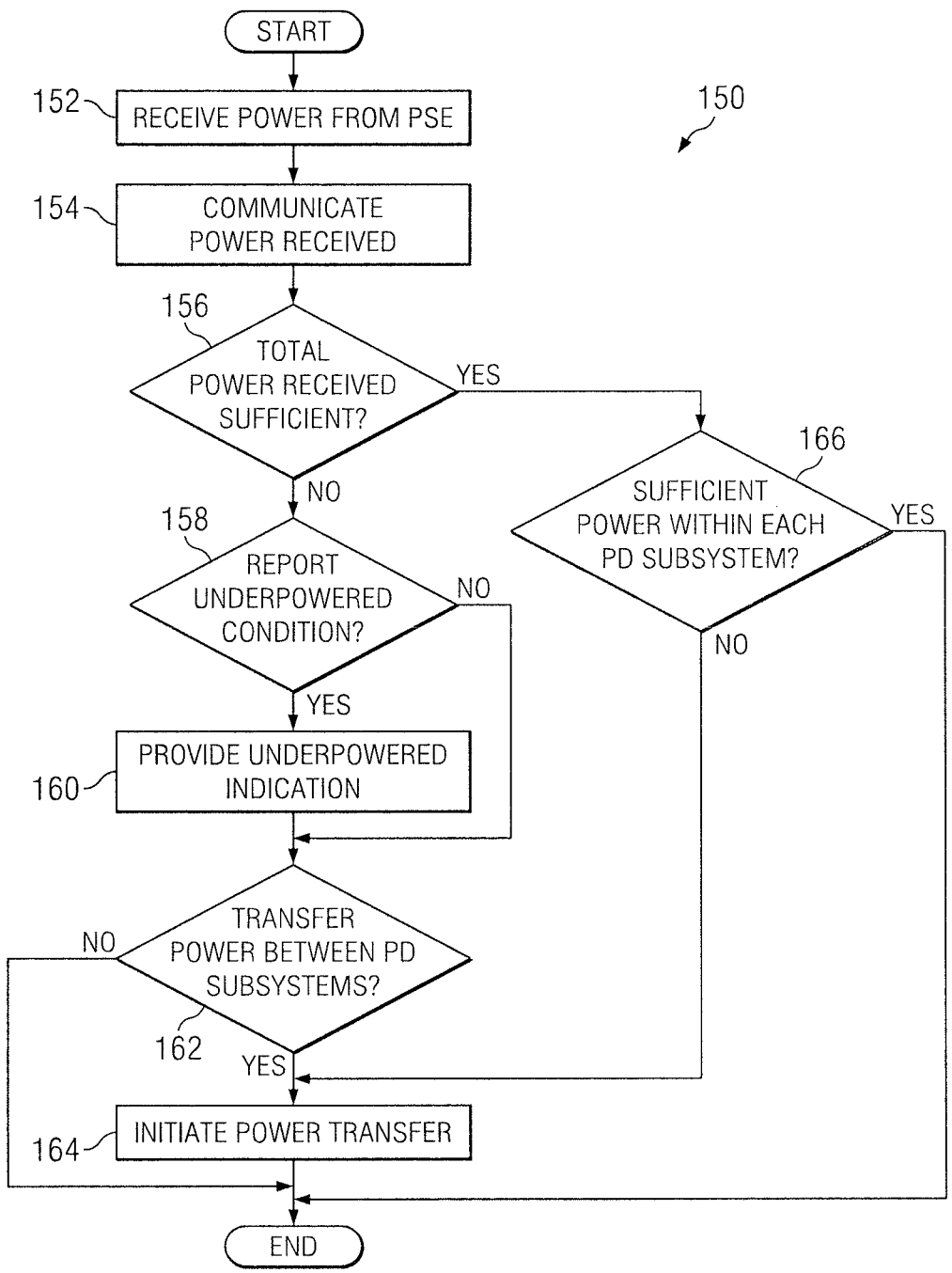
FIG. 6 is a flowchart illustrating a method for obtaining power and reporting an under powered condition utilizing communication and power transfer between electrically-isolated PD subsystems.

FIG. 6 is a flowchart illustrating a method, indicated generally at 150, for obtaining power and reporting an underpowered condition utilizing communication and power transfer between electrically-isolated PD subsystems.

At step 152, one or more of PD subsystems 34a, 34b receives power from power sourcing equipment 14. At step 154, PD subsystems 34a, 34b communicate regarding the amount of power received from power sourcing equipment 14. This communication may also provide an indication of a power deficit. The power deficit may represent the amount of power that a particular PD subsystem 34 needs in addition to the power actually received by power sourcing equipment 14. In particular embodiments, the power deficit indicates when a particular PD subsystem 34 has received power in excess of its needs. After PD subsystems 34a, 34b communicate regarding the power received, PD subsystem 34a may determine whether the total power received by both PD subsystems 34 is sufficient, in step 156. If the power is sufficient, method 150 proceeds to step 166.

Otherwise, at step 158, PD subsystem 34a determines whether or not to report an underpowered condition. If PD subsystem 34a decides to report an underpowered condition, then an indication of the underpowered status is provided in step 160. In particular embodiment, a circuit containing a light emitting diode (LED) causes the LED to be illuminated in order to provide the indication of the underpowered status. In certain embodiments, powered circuitry within PD subsystem 34a generates and transmits a message to power sourcing equipment 14 or another device in system 10. This message may provide the indication of and information regarding the underpowered status.

At step 162, PD subsystem 34a determines whether power needs to be transferred between PD subsystem 34a and PD subsystem 34b. If power is to be transferred, PD subsystem 34a initiates the power transfer at step 164. In particular embodiments, PD subsystem 34a transfers power to PD subsystem 34b using a flyback DC-to-DC circuit. An example of a suitable flyback DC-to-DC circuit is shown and described with respect to FIG. 5B. Once power transfer is complete, method 150 ends.

At step 166, PD subsystem 34a determines whether each of PD subsystems 34a, 34b has sufficient power. In particular embodiments, PD subsystem 34b will not have sufficient power even though the aggregate amount of power received by both PD subsystem 34a and PD subsystem 34b is sufficient for their combined needs. If PD subsystem 34a determines that one of PD subsystems 34a does not have sufficient power, then method 150 returns to step 164, where power transfer is initiated between PD subsystems 34a, 34b. Otherwise, method 150 ends.

The method described with respect to FIG. 6 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order. For example, while PD subsystem 34a is described as performing various steps, any suitable components may perform these steps, including powered device 30 and/or PD subsystem 34b. Moreover, the described decisions and determinations may be controlled by simple hardware circuitry or may be generated by a microprocessor implementing software.

Although the present invention has been described in several embodiments, a myriad of changes and modifications may be suggested to one skilled in the art, and it is intended that the present invention encompass such changes and modifications as fall within the present appended claims.

What is claimed is:

1. A system comprising:
   a powered device comprising:
      a first powered device (PD) subsystem comprising a first controller and a first powered component;
      a second powered device (PD) subsystem electrically isolated from the first PD subsystem, the second PD subsystem comprising a second controller and a second powered component;
      an interface connecting the first PD subsystem and the second PD subsystem wherein the first PD subsystem is operable to:
         receive a communication from the second PD subsystem through the interface; and
         transfer power to the second PD subsystem through the interface; and
   a power sourcing equipment (PSE) connected to the powered device by a link and operable to provide power to both the first PD subsystem and the second PD subsystem through the link.

2. The system of claim 1 wherein the interface comprises one or more of the following circuits: a capacitively coupled interface, a transformer coupled interface, an opto-coupler interface, and a flyback DC-to-DC circuit.

3. The system of claim 1 wherein the second PD subsystem is operable to receive a communication from the first PD subsystem through the interface and to transfer power to the first PD subsystem through the interface.

4. The system of claim 1 wherein:
   the link comprises a standard twisted-pair Ethernet cable including four pairs;
   the PSE is operable to provide power to the first PD subsystem through a first pair and a second pair of the link; and
   the PSE is further operable to provide power to the second PD subsystem through a third pair and a fourth pair of the link.

5. The system of claim 1 wherein the first PD subsystem and the second PD subsystem communicate in order to:
   determine a total power level representing power requirements of both the first PD subsystem and the second PD subsystem; and
   compare the total power level to a received power level, the received power level representing power received from the PSE by both the first PD subsystem and the second PD subsystem.

6. The system of claim 5 wherein an indicator circuit is operable to provide an indication that the powered device is underpowered when the received power level is less than the total power level.

7. The system of claim 1 wherein the first PD subsystem is operable to transfer power to the second PD subsystem when the communication indicates that the second PD subsystem is underpowered.

8. The system of claim 1 wherein the first PD subsystem is operable to transfer power through the interface to the second PD subsystem using a flyback DC-to-DC circuit.

9. A method comprising:
   receiving a first amount of power at a first powered device (PD) subsystem from power sourcing equipment (PSE), the first amount of power received on a link connecting the PSE to a powered device, the powered device comprising the first PD subsystem and a second powered device (PD) subsystem, the second PD subsystem electrically isolated from the first PD subsystem and powered by the PSE over the link connecting the PSE to the powered device;
   receiving an identification of a second amount of power from the second PD subsystem, the second amount of power representing a power deficit of the second PD subsystem;
   based on the first amount of power and the second amount of power, determining whether to transfer power from the first PD subsystem to the second PD subsystem;
   maintaining electrical isolation between the first PD subsystem and the second PD subsystem when power is transferred from the first PD subsystem to the second PD subsystem;
   wherein the first PD subsystem comprises a first controller and a first powered component and the second PD subsystem comprises a second controller and a second powered component.

10. The method of claim 9 wherein:
    an interface connects the first PD subsystem and the second PD subsystem; and the first PD subsystem is operable to receive a communication from the second PD subsystem through the interface and to transfer power to the second PD subsystem through the interface.

11. The method of claim 10 wherein the interface comprises one or more of the following circuits: a capacitively coupled interface, a transformer coupled interface, an opto-coupler interface, and a flyback DC-to-DC circuit.

12. The method of claim 9 wherein:
    the link comprises a standard twisted-pair Ethernet cable including four pairs;
    the PSE is operable to provide power to the first PD subsystem through a first pair and a second pair of the link; and
    the PSE is further operable to provide power to the second PD subsystem through a third pair and a fourth pair of the link.

13. The method of claim 9 further comprising:
    determining a total power level representing power requirements of both the first PD subsystem and the second PD subsystem; and
    comparing the total power level to a received power level, the received power level representing power received from the PSE by both the first PD subsystem and the second PD subsystem.

14. The method of claim 13 wherein an indicator circuit is operable to provide an indication that the powered device is underpowered when the received power level is less than the total power level.

15. The method of claim 9 wherein the identification of the second amount of power indicates one of the following:
    that the second PD subsystem has sufficient power, and
    a power requirement of the second PD subsystem.

16. The method of claim 9 wherein the determination of whether to transfer power comprises:
    identifying a third amount of power, the third amount of power representing a power requirement of the first PD subsystem;
    if the first amount of power is greater than the sum of the second amount of power and the third amount of power, then transferring power from the first PD subsystem to the second PD subsystem.

17. The method of claim 9 wherein the first PD subsystem is operable to transfer power to the second PD subsystem using a flyback DC-to-DC circuit.

18. An apparatus comprising:
a first powered device (PD) subsystem comprising a first controller and a first powered component, the first PD subsystem operable to receive a first amount of power from power sourcing equipment (PSE), the first amount of power received on a link connecting the PSE to the first PD subsystem;
a second powered device (PD) subsystem comprising a second controller and a second powered component, the second PD subsystem electrically isolated from the first PD subsystem, the second PD subsystem operable receive a second amount of power from the PSE on the link, the link further connecting the PSE to the second PD subsystem; and
an interface connecting the first PD subsystem and the second PD subsystem wherein the first PD subsystem is operable to receive a communication from the second PD subsystem through the interface and to transfer power to the second PD subsystem through the interface.

19. The apparatus of claim 18 wherein:
the link comprises' a standard twisted-pair Ethernet cable including four pairs;
the PSE is connected to the first PD subsystem through a first pair and a second pair of the link; and
the PSE is connected to the second PD subsystem through a third pair and a fourth pair of the link.

\* \* \* \* \*